(12) United States Patent
Ishizuka

(10) Patent No.: US 11,659,106 B2
(45) Date of Patent: May 23, 2023

(54) INFORMATION PROCESSING APPARATUS, NON-TRANSITORY COMPUTER READABLE MEDIUM, AND CHARACTER RECOGNITION SYSTEM

(71) Applicant: FUJIFILM Business Innovation Corp., Tokyo (JP)

(72) Inventor: Miho Ishizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 86 days.

(21) Appl. No.: 17/123,046

(22) Filed: Dec. 15, 2020

(65) Prior Publication Data

US 2021/0319273 A1 Oct. 14, 2021

(30) Foreign Application Priority Data

Apr. 8, 2020 (JP) ............................. JP2020-069827

(51) Int. Cl.
| | |
|---|---|
| *H04N 1/00* | (2006.01) |
| *G06V 30/244* | (2022.01) |
| *G06V 30/32* | (2022.01) |
| *G06V 30/262* | (2022.01) |
| *G06V 30/226* | (2022.01) |
| *G06V 30/10* | (2022.01) |

(52) U.S. Cl.
CPC ....... *H04N 1/00331* (2013.01); *G06V 30/226* (2022.01); *G06V 30/2445* (2022.01); *G06V 30/2455* (2022.01); *G06V 30/274* (2022.01); *G06V 30/32* (2022.01); *G06V 30/10* (2022.01)

(58) Field of Classification Search
CPC .. G06V 30/2445; G06V 30/10; G06V 30/226; G06V 30/32; G06V 30/2455; G06V 30/274; H04N 1/00331
See application file for complete search history.

(56) References Cited

U.S. PATENT DOCUMENTS

| | | | | |
|---|---|---|---|---|
| 5,077,811 A * | 12/1991 | Onda | ................. | H04N 1/00809 382/290 |
| 6,233,545 B1 * | 5/2001 | Datig | ..................... | G06N 3/004 706/62 |
| 6,616,703 B1 * | 9/2003 | Nakagawa | ............ | G06F 40/274 715/201 |
| 7,573,615 B2 * | 8/2009 | Kasatani | ............ | H04N 1/00225 382/229 |
| 9,349,045 B2 * | 5/2016 | Bouaziz | .............. | G06F 3/04883 |
| 9,557,936 B2 * | 1/2017 | Anderson | ............. | G06F 3/0673 |
| 9,582,476 B2 * | 2/2017 | Hasegawa | ........ | G06V 30/18095 |
| 9,589,185 B2 * | 3/2017 | Chulinin | .......... | G06V 30/19173 |
| 9,665,786 B2 * | 5/2017 | Gross | ..................... | G06V 30/36 |
| 10,248,635 B2 * | 4/2019 | Couelier | ............ | G06F 3/04883 |
| 10,318,613 B2 * | 6/2019 | Rucine | ................... | G06V 30/40 |
| 10,423,852 B1 * | 9/2019 | Sarraf | .................... | G06N 3/044 |

(Continued)

FOREIGN PATENT DOCUMENTS

JP H09134357 5/1997

*Primary Examiner* — Anand P Bhatnagar
(74) *Attorney, Agent, or Firm* — JCIPRNET

(57) ABSTRACT

An information processing apparatus includes a processor configured to acquire a result of character recognition of a character string formed on a medium and read by scanning that is subject to character recognition and replace a character or a symbol in a subject with a reference character string that is referred to by the character or the symbol.

13 Claims, 15 Drawing Sheets

(56) References Cited

U.S. PATENT DOCUMENTS

| | | | | |
|---|---|---|---|---|
| 10,462,326 | B2* | 10/2019 | Chapman | G06F 3/1243 |
| 10,936,862 | B2* | 3/2021 | Such | G06V 30/414 |
| 10,949,697 | B2* | 3/2021 | Hikosaka | G06F 40/58 |
| 10,956,686 | B2* | 3/2021 | Takamiya | G06F 40/58 |
| 2001/0043740 | A1* | 11/2001 | Ichikawa | G06V 30/412 |
| | | | | 382/176 |
| 2008/0177468 | A1* | 7/2008 | Halters | G01C 21/3611 |
| | | | | 701/532 |
| 2009/0272812 | A1* | 11/2009 | Marty | G06V 30/1448 |
| | | | | 235/470 |
| 2010/0259484 | A1* | 10/2010 | Jo | G06F 3/04883 |
| | | | | 345/171 |
| 2013/0054222 | A1* | 2/2013 | Sharma | G06V 30/1478 |
| | | | | 704/2 |
| 2016/0224687 | A1* | 8/2016 | Kurabayashi | G06F 40/274 |
| 2016/0247035 | A1* | 8/2016 | Gross | G06V 10/768 |
| 2016/0357709 | A1* | 12/2016 | Hsu | G06F 40/103 |
| 2017/0255614 | A1* | 9/2017 | Vukosavljevic | G06V 30/1478 |
| 2019/0244020 | A1* | 8/2019 | Yoshino | G06V 20/62 |
| 2019/0247035 | A1* | 8/2019 | Gittard | A61M 25/0041 |
| 2019/0294910 | A1* | 9/2019 | Sarraf | G06V 30/224 |
| 2020/0202173 | A1* | 6/2020 | Oishi | G06V 10/82 |
| 2020/0410173 | A1* | 12/2020 | Takamiya | G06F 40/58 |

\* cited by examiner

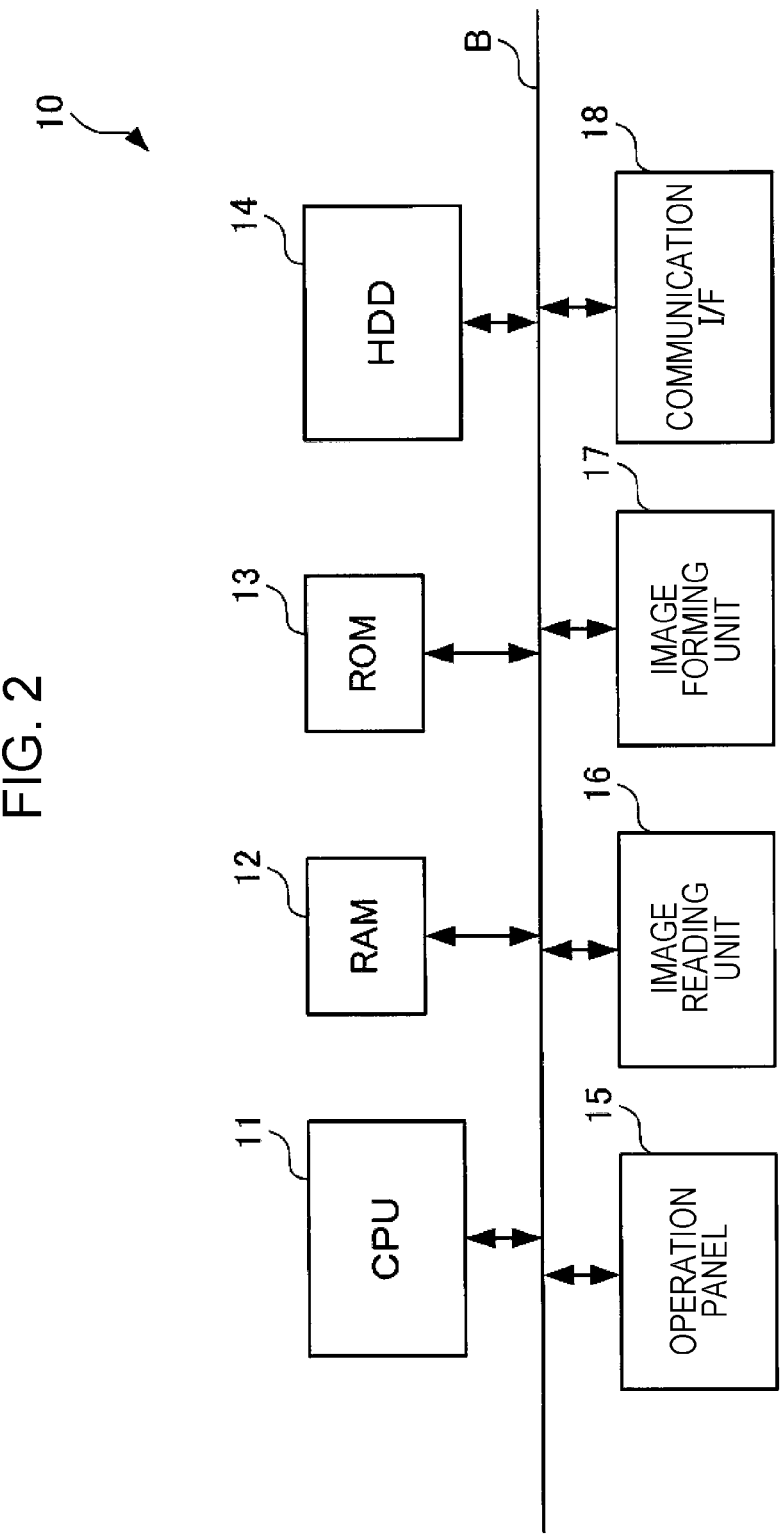

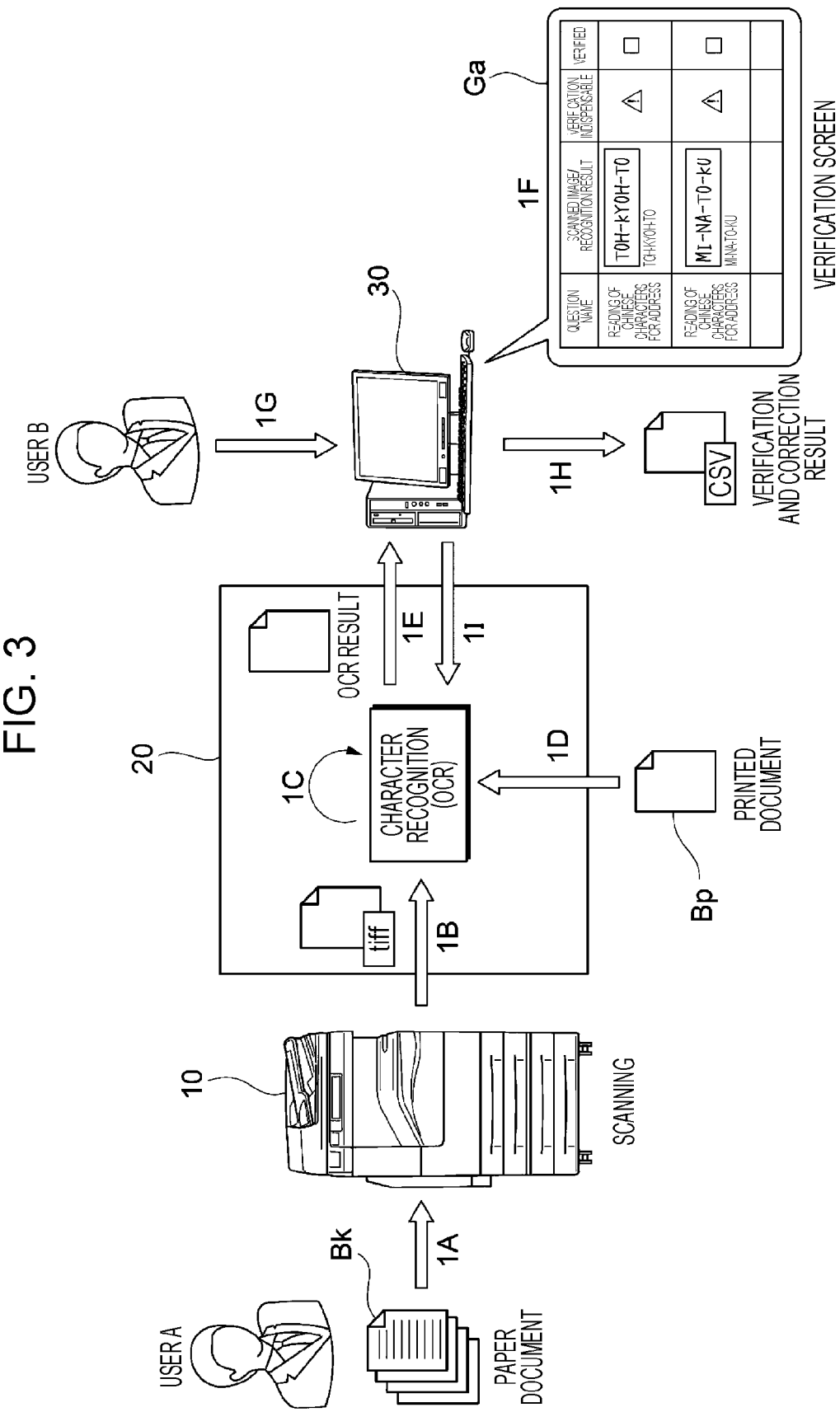

FIG. 4

*FILL IN ONLY THE THICK LINE FRAME.
CURRENT STATE NOTIFICATION FOR EXEMPLIFIED XX ALLOWANCE, FISCAL HEISEI (ERA NAME) 30

I NOTIFY THE CURRENT STATE AS FOLLOWS.
I AGREE TO THE VERIFICATION OF INCOME AND THE LIKE BASED ON
CURRENTLY HELD OFFICIAL RECORDS FOR RECIPIENT QUALIFICATION EXAMINATION.

SUBMISSION DATE ☐ (YEAR) ☐ (MONTH) ☐ (DAY)

RECOGNITION NUMBER 1298764

| | | | | | | | |
|---|---|---|---|---|---|---|---|
| RECIPIENT | (READING OF CHINESE CHARACTERS) | TA-RO TE-SU-TO | | | | DATE OF BIRTH | SEX |
| | FULL NAME *SIGN OR SEAL | TARO TEST | | TEST | | 4 (YEAR) 5 (MONTH) 21 (DAY) | (MALE) FEMALE |
| | ADDRESS | X-Y-Z AICHI CITY, AICHI PREFECTURE | | | | SHOWA (HEISEI) | FULL NAME |
| | PHONE NO. | 100-1234-1111 | ☐ IN WARD ☑ OUTSIDE WARD IF CHANGED ☐ OVERSEAS | | | M·S MARRIED (M) (FULL NAME OF SPOUSE) OR SINGLE (S) | ORGANIZATION, IF CIVIL SERVANT |
| | ADDRESS AS OF JAN. 1, HEISEI 30 | | | | | | |
| | RECIPIENT CHARACTERISTIC | ☐ PARENT ☐ GUARDIAN OF MINOR ☐ NOMINEE BY PARENT ☐ OTHERS | | | | OCCUPATION OF SPOUSE | ☑ NONE ☐ COMPANY EMPLOYEE ☐ CIVIL SERVANT ☐ SELF-EMPLOYED ☐ OTHERS |
| DEPENDENT UNDER 18 | | FULL NAME | FAMILY RELATIONSHIP | DATE OF BIRTH | LIVING TOGETHER (T) OR SEPARATELY (S) | ADDRESS (WRITE ONLY IF LIVING SEPARATELY) | SELF-EMPLOYED · OTHERS | SUPPORT RELATIONSHIP |
| | 1 | TEACHER TEST | | H.20.9.15 | T S | ☐ IN WARD ☐ OUTSIDE WARD | X-Y-Z AICHI CITY | xxx xxx xxx | YES NO | DEPEND xx |
| | 2 | IS THIS | | FEB. 25, SHOWA 53 | T S | ☐ IN WARD ☐ OUTSIDE WARD | SAME AS ABOVE | YES NO | DEPEND xx |
| | 3 | | | | T S | ☐ IN WARD ☐ OUTSIDE WARD | | YES NO | DEPEND xx |
| | 4 | | | | T S | ☐ IN WARD ☐ OUTSIDE WARD | | YES NO | DEPEND xx |
| | 5 | | | | T S | ☐ IN WARD ☐ OUTSIDE WARD | | YES NO | DEPEND xx |

PENSION QUALIFICATION OF RECIPIENT/ORGANIZATION OR OCCUPATION

☐ EMPLOYEE
☐ MUTUAL AID
☐ NATIONAL
☐ NOT COVERED

PHONE NO. (   )   -

○ xxxxxxxxxxxxxxxxxxxxxxxxxxx
○ xxxxxxxxxxxxxxxxxxxxxxxxxxx
○ xxxxxxxxxxxxxxxxxxxxxxxxxxx

* xxxxxxxxxxxxxxxxxxxxxxx
* xxxxxxxxxxxxxxxxxxxxxxx
* xxxxxxxxxxxxxxxxxxxxxxx

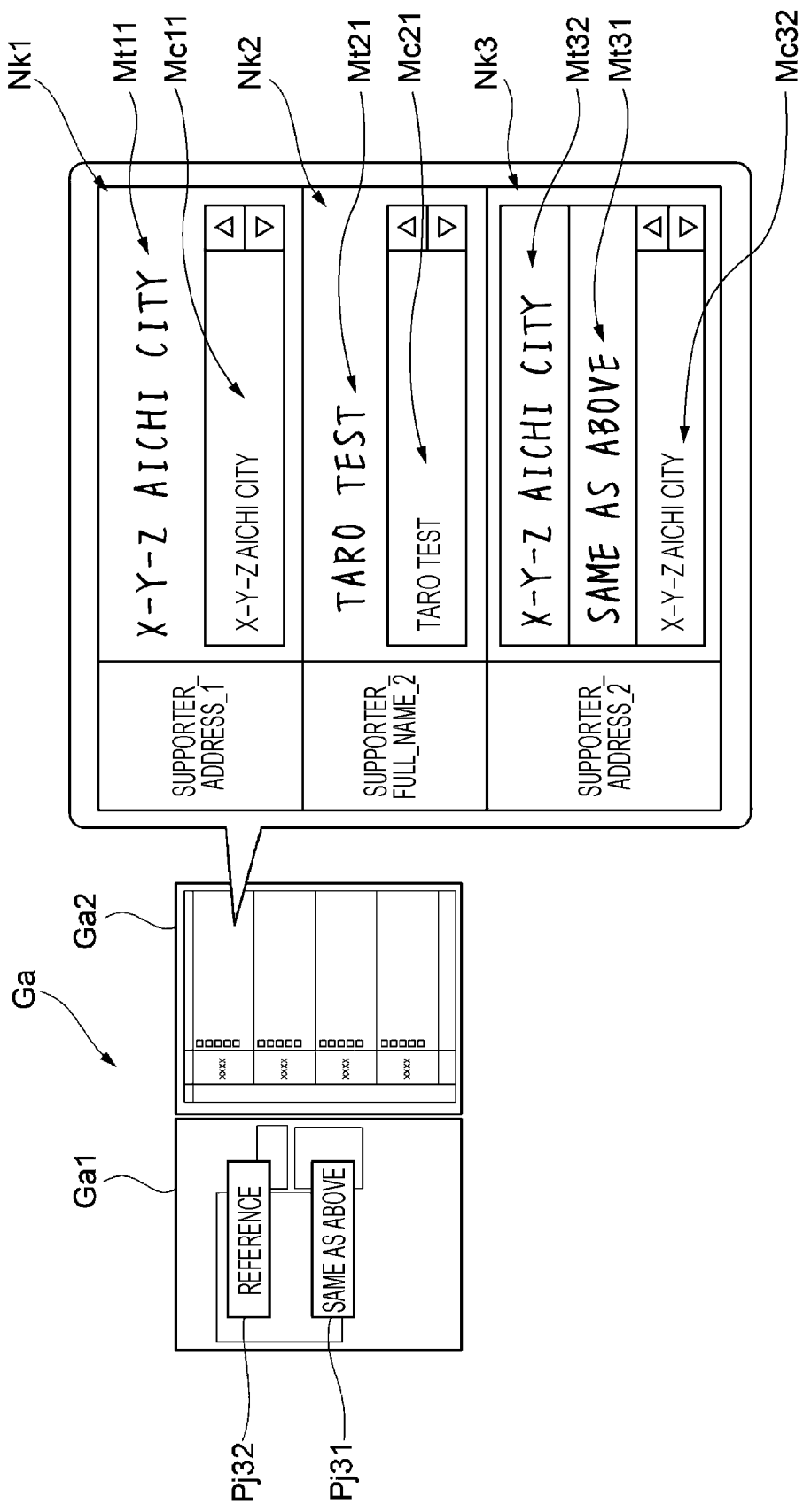

INFORMATION PROCESSING APPARATUS, NON-TRANSITORY COMPUTER READABLE MEDIUM, AND CHARACTER RECOGNITION SYSTEM

CROSS-REFERENCE TO RELATED APPLICATIONS

This application is based on and claims priority under 35 USC 119 from Japanese Patent Application No. 2020-069827 filed Apr. 8, 2020.

BACKGROUND

(i) Technical Field

The present disclosure relates to an information processing apparatus, a non-transitory computer readable medium, and a character recognition system.

(ii) Related Art

To date, there is a technology for recognizing handwritten characters in the entry fields in the document by using optical character recognition (OCR). Processing of prompting a user to verify whether the result of the character recognition is correct is then performed on occasions.

Japanese Unexamined Patent Application Publication No. 9-134357 discloses a character processing device. Document data input from an input unit is stored in a data memory. When a matching determination unit determines that leading characters of a character string in the data stored in the data memory match those of a different character string in the data, a character string replacement unit reads a specific character string from a specific character string memory and replaces one of the matching character strings with the specific character string, and further a space insertion unit interpolates spaces by replacement. In addition, the specific character string in the data is restored to the original character string.

SUMMARY

When identical character strings are expected to be written in respective entry fields, at least one of the entry fields may include characters such as "same as above", "same as left", or "ditto", or the symbol """ on occasions. The characters and the symbol refer to a reference character string that has appeared previously. However, if the characters or the symbol is recognized as it is in the OCR, a user needs to find a character string referred to by the characters or the symbol in the document and verify the character string. In this case, the user has a larger burden.

Aspects of non-limiting embodiments of the present disclosure relate to providing, for example, an information processing apparatus that reduces the burden of verifying the result of character recognition placed on a user even in the presence of a character string or a symbol that refers to a reference character string that has appeared previously.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor configured to acquire a result of character recognition of a handwritten character string and in response to a determination that the handwritten character string includes a character or a symbol that refers to a reference character string that has appeared previously, replace the character or the symbol with the reference character string that is referred to by the character or the symbol.

BRIEF DESCRIPTION OF THE DRAWINGS

An exemplary embodiment of the present disclosure will be described in detail based on the following figures, wherein:

FIG. 2 is a diagram illustrating an example hardware configuration of an image forming apparatus;

FIG. 3 is a view illustrating the operation overview of the character recognition system;

FIG. 4 is a view illustrating an example of a paper document of this exemplary embodiment;

FIGS. 8A and 8B are views illustrating a first example of a verification screen;

DETAILED DESCRIPTION

Hereinafter, an exemplary embodiment of the present disclosure will be described in detail with reference to the attached drawings.

Overview of Character Recognition System

Figure 1:
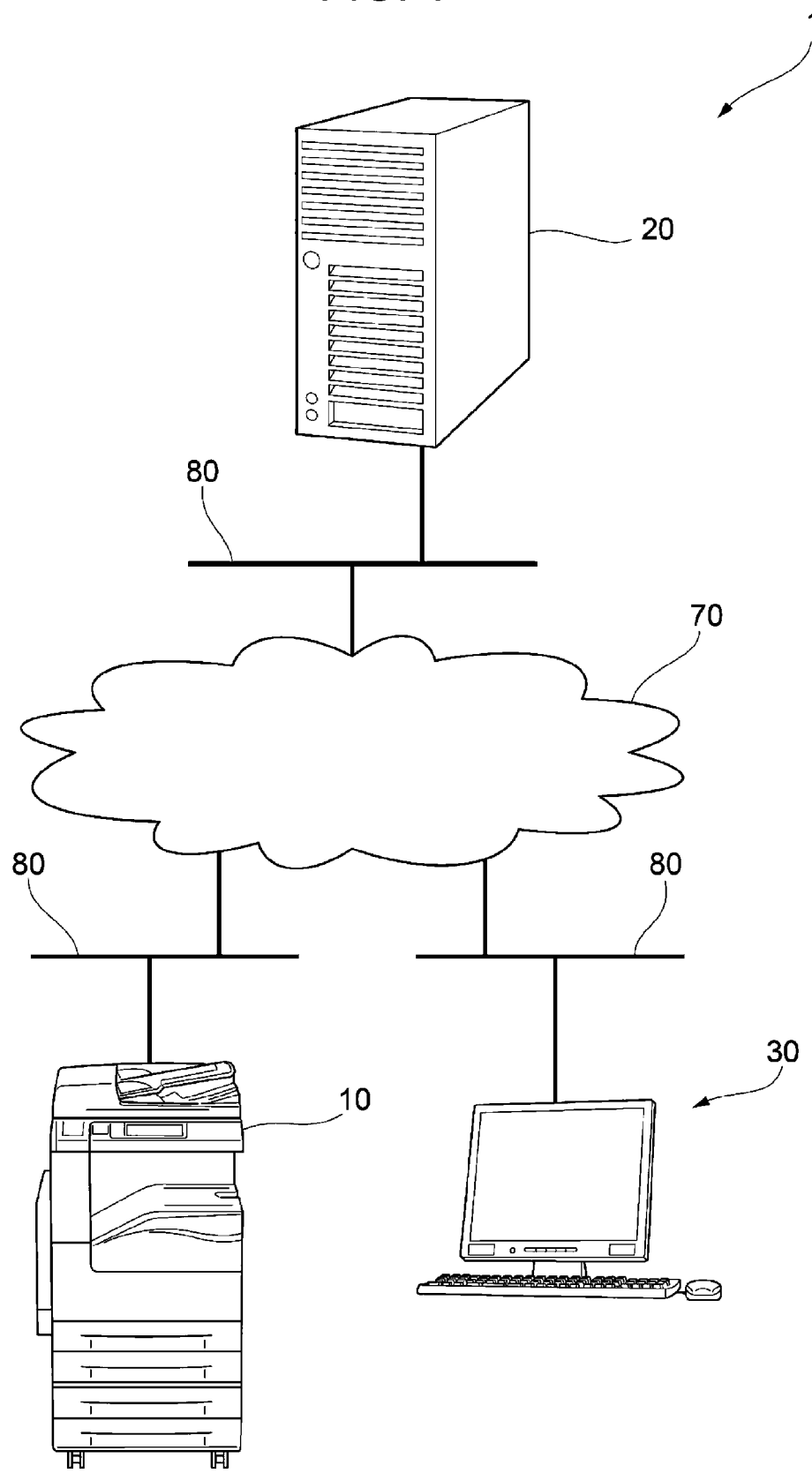
FIG. 1 is a diagram illustrating an example configuration of a character recognition system in this exemplary embodiment.

FIG. 1 is a diagram illustrating an example configuration of a character recognition system 1 in this exemplary embodiment.

As illustrated in FIG. 1, the character recognition system 1 of this exemplary embodiment includes an image forming apparatus 10, a management server 20, and a terminal apparatus 30 that are connected via a network 70 and networks 80.

Although FIG. 1 illustrates one image forming apparatus 10 and one terminal apparatus 30, image forming apparatuses 10 and terminal apparatuses 30 may be provided.

The image forming apparatus 10 forms an image on a recording medium such as paper and outputs a printing medium. The image forming apparatus 10 has a printer function and also has other image processing functions such as a scanner function and a fax machine function.

FIG. 2 is a diagram illustrating an example hardware configuration of the image forming apparatus 10.

As illustrated in FIG. 2, the image forming apparatus 10 includes a central processing unit (CPU) 11, a random access memory (RAM) 12, a read only memory (ROM) 13, a hard disk drive (HDD) 14, an operation panel 15, an image reading unit 16, an image forming unit 17, and a communication interface (hereinafter, referred to as a communication I/F) 18. These components exchange required data via a bus B.

The CPU 11 implements functions (described later) in such a manner as to load a program stored in the ROM 13 or other components in the RAM 12 and run the program.

The RAM 12 is used, for example, as a work memory for the CPU 11.

The ROM 13 stores, for example, various programs run by the CPU 11.

The HDD 14 is, for example, a magnetic disk that stores image information read by the image reading unit 16, image information used for image forming in the image forming unit 17, and other pieces of information.

The operation panel 15 is, for example, a touch panel that displays various pieces of information and receives an input operation from a user. A displaying mechanism has a display such as a liquid crystal panel used to display content (the content of information) as an image in a predetermined area. The displaying mechanism also has a function of detecting a position at which an object such as a finger of a person or a stylus pen comes in contact with the liquid crystal panel. In this exemplary embodiment, the touch panel is not particularly limited, and touch panels using various methods such as a resistive touch panel and a capacitance touch panel may also be used.

The image reading unit 16 is an example of a reader and reads an image recorded on the document. In this exemplary embodiment, the image reading unit 16 reads a document having handwritten character strings as an image.

The image reading unit 16 is, for example, a scanner, and a charge coupled device (CCD) system and a contact image sensor (CIS) system may desirably be used. In the CCD system, light beams emitted from the light source and reflected from the document are reduced by a lens and received by CCDs. In the CIS system, light beams serially emitted from a light emitting diode (LED) light source and reflected from the document are received.

The image forming unit 17 is an example of a printing mechanism that forms an image on the recording medium. The image forming unit 17 is, for example, a printer, and an electrophotographic system and an inkjet system may desirably be used. In the electrophotographic system, toner adhered to a photo conductor is transferred to a recording medium such as paper, and an image is thereby formed. In the inkjet system, ink is jetted out onto a recording medium, and an image is thereby formed.

The communication I/F 18 transmits and receives various pieces of information to and from a different apparatus via the networks 70 and 80.

The management server 20 is a server computer that performs overall management of the character recognition system 1. The management server 20 may be referred to as a cloud server when the management server 20 is included in a cloud system. The management server 20, for example, authenticates users who operate the image forming apparatus 10 and the terminal apparatus 30 and transmits and receives electronic information to and from the image forming apparatus 10 or the terminal apparatus 30. The term "electronic information" denotes information digitized from any information. In the electronic information, for example, the type, the form, and the data structure of information are not particularly limited as long as the information is handleable by each of the image forming apparatus 10, the management server 20, and the terminal apparatus 30. Examples of the electronic information handled by the character recognition system 1 of this exemplary embodiment include character information and image information.

The management server 20 is an example of a character recognizer and performs character recognition of handwritten character strings read by the image reading unit 16 of the image forming apparatus 10. This will be described in detail later.

The management server 20 includes a CPU that is an arithmetic unit, a main memory that is a memory, and storages such as a HDD and a solid state drive (SSD). The CPU runs various pieces of software such as an operating system (OS) (basic software) and application software. The main memory is a memory area where the various pieces of software and data used for running the software are stored. Each storage is a memory area where data input in the various pieces of software, data output from the various pieces of software, and the like are stored.

The management server 20 further includes a communication I/F for communicating with an external apparatus and an input device such as a keyboard, a mouse, a touch panel, and a stylus pen. The management server 20 may also include a display device such as a liquid crystal display.

The terminal apparatus 30 is an apparatus with which a user verifies the result of character recognition performed by the management server 20. The terminal apparatus 30 is, for example, a general personal computer (PC). The terminal apparatus 30 is designed to, for example, generate electronic information by running application software under the control of the OS. The result of the character recognition may hereinafter be referred to as an OCR result.

The terminal apparatus 30 includes a CPU, a main memory, storages, a communication I/F, and an input device, like the management server 20. These apparatuses are each an example of an information processing apparatus or an image generator and generate a verification screen that prompts the user to verify a result of OCR by the management server 20. The CPU is an example of a processor. The terminal apparatus 30 includes a display device that is an example of a display that displays a verification screen.

The network 70 is a communication medium used for telecommunications between the image forming apparatus 10, the management server 20, and the terminal apparatus 30 and is, for example, the Internet.

Like the network 70, each network 80 is also a communication medium used for telecommunications between the image forming apparatus 10, the management server 20, and the terminal apparatus 30 and is, for example, a local area network (LAN).

Operation Overview of Character Recognition System 1

FIG. 3 is a view illustrating the operation overview of the character recognition system 1.

In this example, a user A operates the image forming apparatus 10, and a user B operates the terminal apparatus 30. The users A and B are authenticated in advance by the management server 20.

First, the user A scans a paper document Bk with the image forming apparatus 10 (1A). The scanning is performed with the image reading unit 16 of the image forming apparatus 10, and the result is transmitted to the management server 20 (1B) as electronic information that is image information.

A paper document is an example of a document and results from the handwriting by the user A or a different user on a printed document Bp printed in a predetermined format. The paper document Bk is not particularly limited, and examples thereof include a business form, a questionnaire form, a slip, an application form, a registration form, and a draft proposal submitted for endorsement.

FIG. 4 is a view illustrating an example of the paper document Bk of this exemplary embodiment.

FIG. 4 illustrates the paper document Bk that is a business form and a case where the user A handwrites characters as character strings Mt on the printed document Bp printed in the predetermined format. Entry fields Ra such as for a full name and an address are printed on the printed document Bp in advance, and the user A writes their full name and address in the respective entry fields Ra as handwritten character strings Mt. Each entry field Ra may be regarded as a frame in which the user A writes or as a recognition frame to undergo character recognition.

Referring again to FIG. 3, upon receiving the electronic information as the result of scanning, the management server 20 performs character recognition by the OCR (1C). For this step, for example, each entry field Ra in the printed document Bp is registered in the management server 20 in advance (1D). Parts corresponding to respective handwritten character strings Mt are each extracted on the basis of the corresponding registered entry field Ra, and character recognition of each extracted handwritten character Mt is performed with the OCR.

The management server 20 transmits the OCR result to the terminal apparatus 30 (1E).

The terminal apparatus 30 displays a verification screen Ga for prompting the user B to verify whether the OCR result is correct (1F). This will be described in detail later. That is, in this case, the user B is a person in charge or an administrator who verifies whether the OCR result is correct.

The user B verifies the OCR result on the verification screen Ga. If there is an item to be corrected, the user B corrects the OCR result (1G). After the user B verifies the OCR result, a verification and correction result is output (1H). The verification and correction result is also transmitted to the management server 20 and stored therein (1I).

Figure 5:
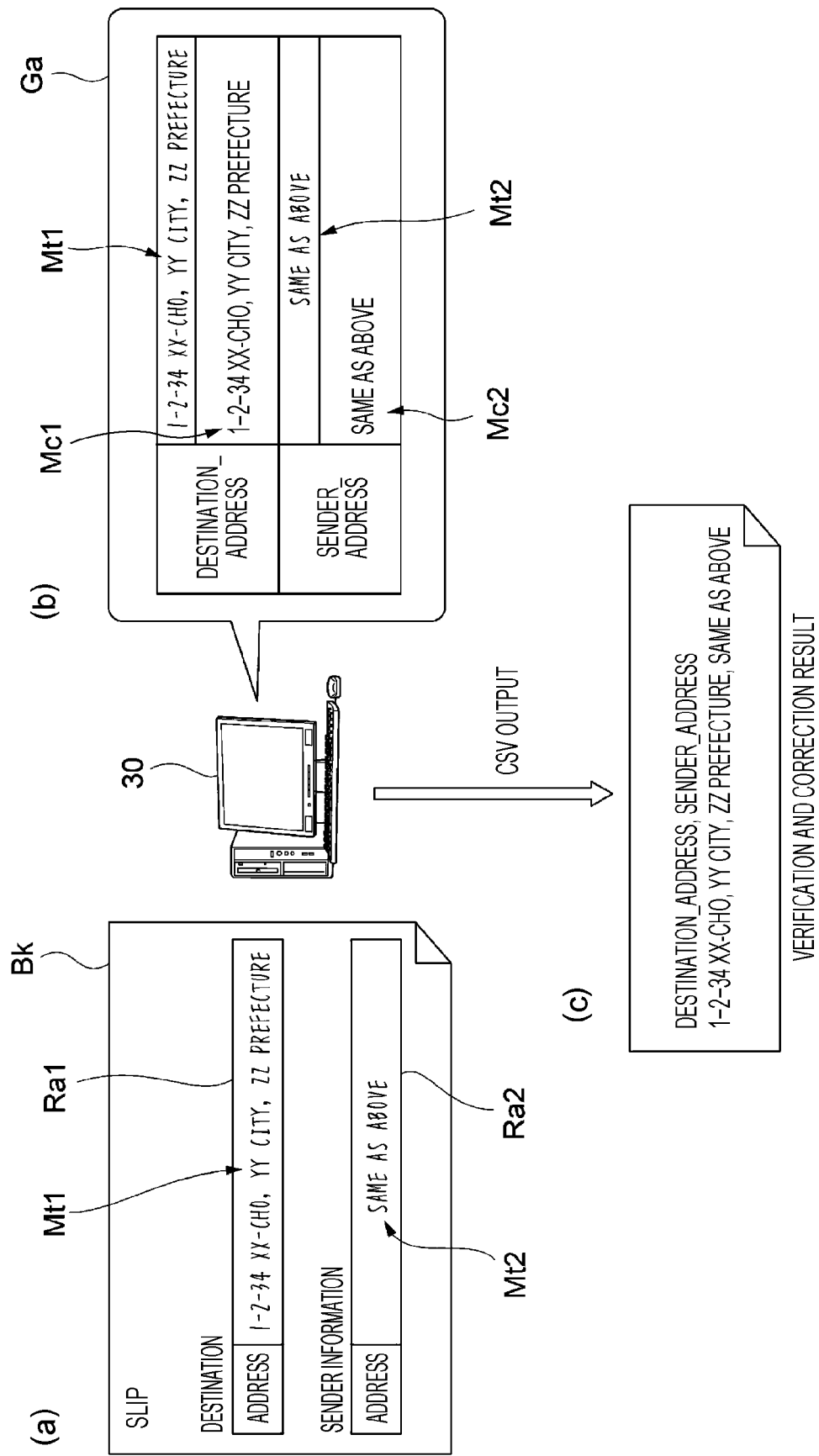
FIG. 5 is a view illustrating an example verification step performed of an OCR result in the related art as a verification step in 1G in FIG. 3.

FIG. 5 is a view illustrating an example verification step performed of an OCR result in the related art as a verification step in 1G in FIG. 3.

FIG. 5(a) illustrates the paper document Bk scanned in 1A in FIG. 3.

The paper document Bk is a slip, and entry fields Ra1 and Ra2 for addresses are respectively provided as destination information and sender information. FIG. 5(a) illustrates a case where the user A writes the address of the destination as a character string Mt1 in the entry field Ra1 and a case where the user A writes the address of the sender as a handwritten character string Mt2. Since the address of the destination is identical to the address of the sender in the example illustrated in FIG. 5, the user A writes the actual address as the character string Mt1 in the former case and "same as above" as the character string Mt2 to indicate identicalness to the already written address in the latter case.

FIG. 5(b) illustrates the result of the OCR of the paper document Bk illustrated in FIG. 5(a).

This is part of the verification screen Ga displayed in 1F in FIG. 3. The OCR result illustrated in FIG. 5(b) indicates that the character string Mt1 handwritten by the user A is recognized as a character string Mc1 for the destination address, and the character string Mt2 handwritten by the user A is recognized as a character string Mc2 for the sender address.

FIG. 5(c) illustrates an example of the verification and correction result stored in 1H in FIG. 3.

In this example, the verification and correction result is output in a comma separated value (CSV) format. FIG. 5(c) illustrates the output data "destination_address, sender_address, 1-2-34 XX-cho, YY City, ZZ Prefecture, same as above".

However, when "same as above" as the character string Mc2 is displayed as it is as the OCR result on the verification screen Ga as illustrated in FIG. 5(b), the user B who is to verify the OCR result needs to find the character string Mt1 corresponding to "same as above" from the original paper document Bk and manually input the content of the character string Mt1. In this case, after the user B finds "same as above" as the character string Mc2 on the verification screen Ga, the user B searches for the character string Mt2 in an image representing the paper document Bk. The user B further searches for the character string Mt1 in the image and corrects the content of the character string Mc2 from "same as above" to "1-2-34 XX-cho, YY City, ZZ Prefecture". In this case, the user B verifying the OCR result has a larger burden.

Although FIG. 5 illustrates the case of "same as above", the same holds true for a case where the character string "same as left" or "ditto", or the symbol """ is written in the paper document Bk.

Hence, in this exemplary embodiment, the character recognition system 1 has a configuration as described below, and thus the burden on the user B is reduced.

Configuration of Character Recognition System 1

Figure 6:
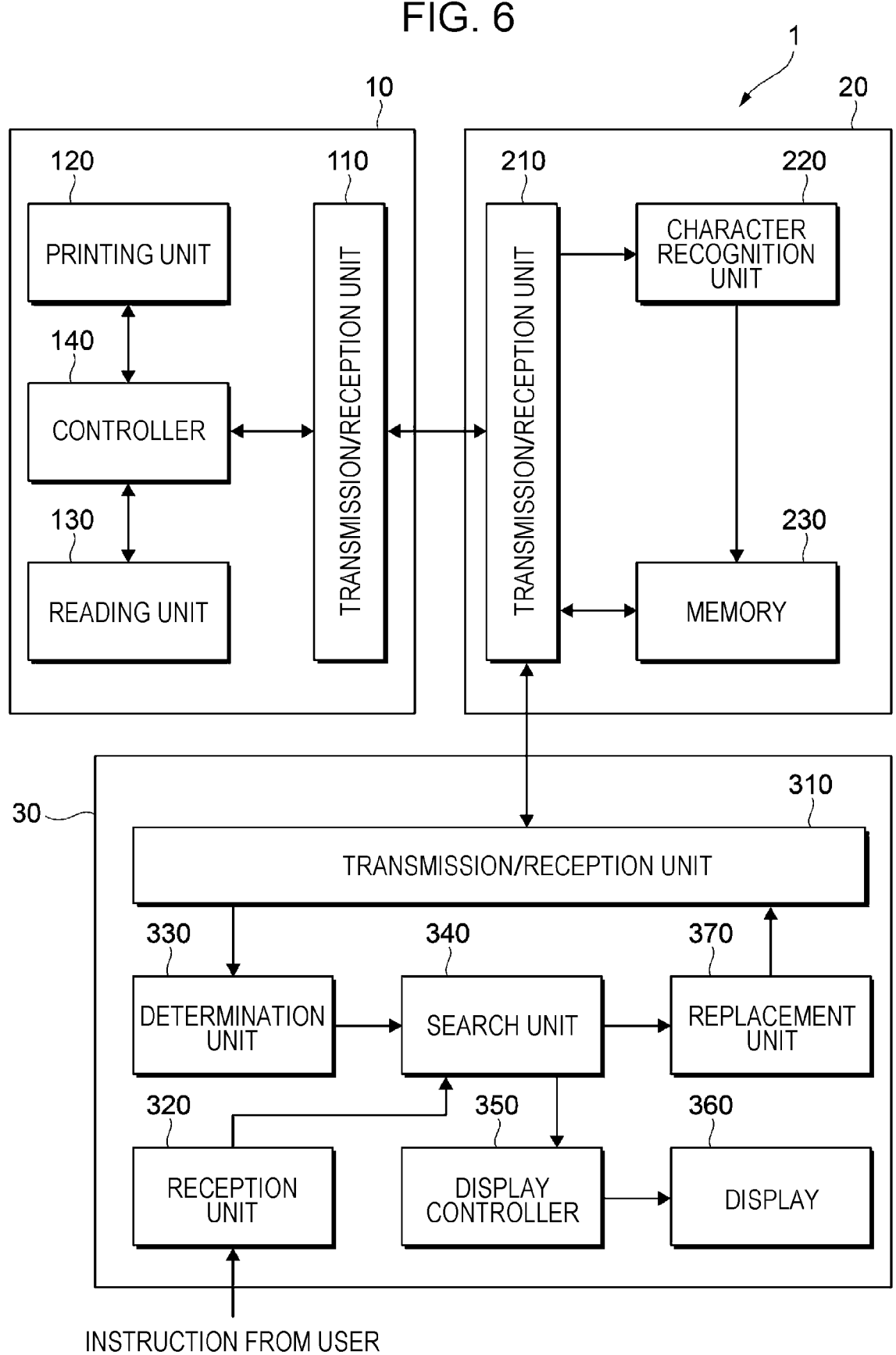
FIG. 6 is a block diagram illustrating an example functional configuration of an information processing system in this exemplary embodiment.

FIG. 6 is a block diagram illustrating an example functional configuration of the character recognition system 1 in this exemplary embodiment.

Note that FIG. 6 illustrates selected functions related to this exemplary embodiment among various functions of the character recognition system 1.

The image forming apparatus 10 in the character recognition system 1 includes a transmission/reception unit 110, a printing unit 120, a reading unit 130 that performs a scanning operation, and a controller 140.

The transmission/reception unit 110 transmits and receives electronic information to and from the management server 20. The transmission/reception unit 110 transmits image information regarding the scanned paper document Bk to the management server 20. The transmission/reception unit 110 corresponds to, for example, the communication I/F 18.

The printing unit 120 is the printing mechanism and performs printing on a recording medium such as paper. The printing unit 120 corresponds to, for example, the image forming unit 17.

The reading unit 130 reads the paper document Bk by scanning and generates image information. The reading unit 130 corresponds to, for example, the image reading unit 16.

The controller 140 performs overall control of the image forming apparatus 10. The controller 140 corresponds to, for example, the CPU 11, the RAM 12, and the ROM 13.

The management server 20 includes a transmission/reception unit 210, a character recognition unit 220, and a memory 230.

The transmission/reception unit 210 transmits and receives electronic information to and from the image forming apparatus 10 or the terminal apparatus 30. The transmission/reception unit 210 receives the image information regarding the paper document Bk scanned by the image forming apparatus 10 and also transmits the result of the OCR of the paper document Bk to the terminal apparatus 30.

The character recognition unit 220 is an OCR device and performs the character recognition of each handwritten character string Mt in the paper document Bk. The memory 230 also stores the image information regarding the paper document Bk received by the transmission/reception unit 210, an OCR result that is the result of the character recognition, and definition information regarding the entry fields Ra.

The definition information includes information regarding the attribute, the position, and the size of each entry field Ra in the paper document Bk. The attribute information includes recognition frame names and dictionary names. Each recognition frame name is the name of the corresponding entry field Ra and also the name of the corresponding frame to undergo the character recognition. Each dictionary name is the name of a dictionary used for the corresponding entry field Ra. The dictionary is used in the character recognition, and a dictionary to be applied is predetermined in accordance with the content of the character string Mt written in the entry field Ra. For example, when an entry field Ra is provided for writing a full name, the name dictionary is applied. That is, the name dictionary is, for example, a dictionary having collected names of persons and has content suitable for character recognition of a full name. When an entry field Ra is provided for writing an address, an address dictionary is applied. Examples of the dictionaries include a date dictionary used for an entry field Ra for writing a date. The information regarding the attribute, the position, and the size of each entry field Ra in the paper document Bk is represented as information regarding the coordinates of the entry field Ra in the paper document Bk.

The character recognition unit 220 performs the character recognition of each handwritten character string Mt on the basis of the definition information.

The memory 230 associates the image information regarding the paper document Bk, the definition information regarding the entry field Ra, and the result of the OCR by the character recognition unit 220 with each other and stores these as character recognition data.

Figure 7:
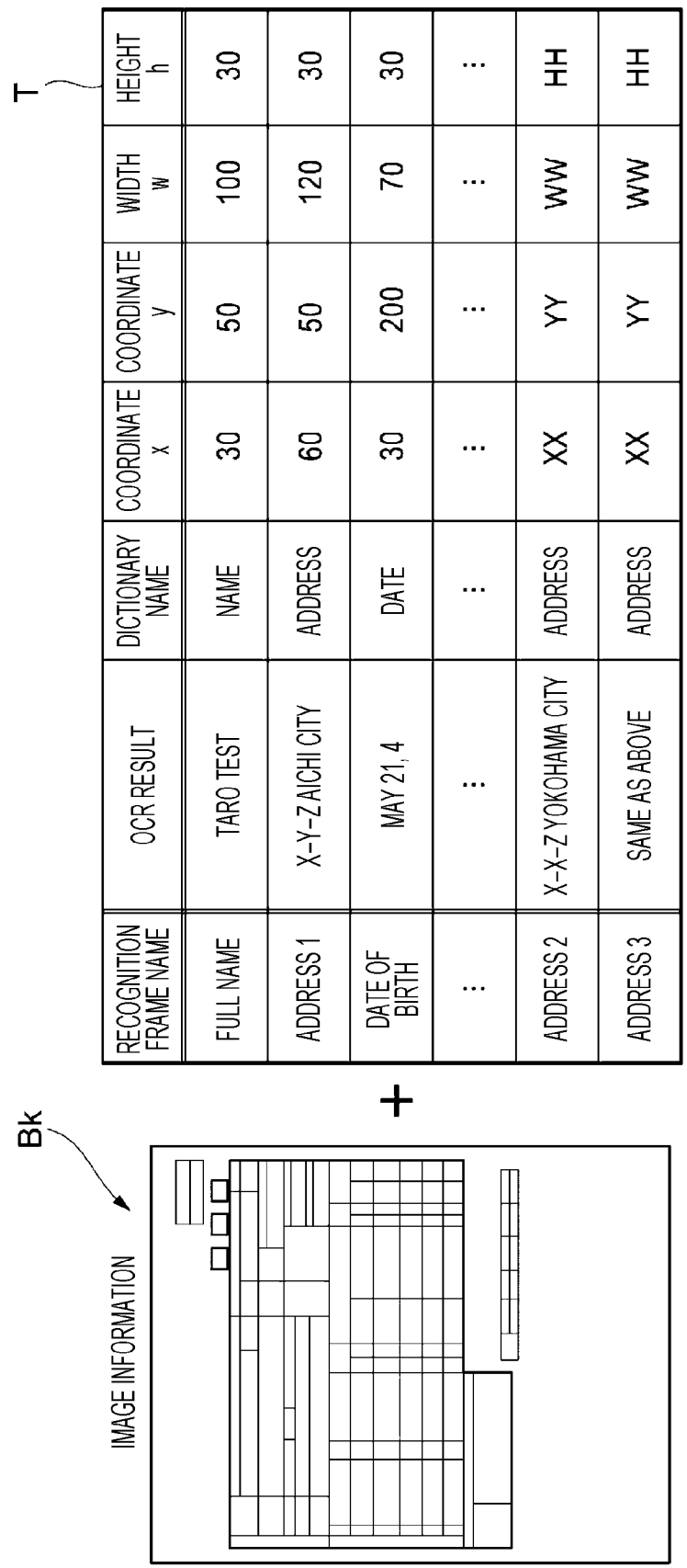
FIG. 7 is a view illustrating the data structure of character recognition data stored in the memory.

FIG. 7 is a view illustrating the data structure of the character recognition data stored in the memory 230.

The data structure illustrated in FIG. 7 may be expressed by the combination of the image information regarding the paper document Bk received by the transmission/reception unit 210 and a table T for storing results of the character recognition. The table T has records having values for the columns for a recognition frame name, an OCR result, a dictionary name, a coordinate x, a coordinate y, a width w, and a height h".

The recognition frame name is the name of an entry field Ra. The recognition frame name is also information indicating the content of the character string written in the entry field Ra. It is understood that names such as a full name, an address 1, and a date of birth are assigned to the respective entry fields Ra and a full name, an address, a date of birth are written therein. The OCR result is the result of the OCR of a character string Mt written in the entry field Ra. Further, the dictionary name is the name of a dictionary used for the entry field Ra. In this case, in other words, the dictionary name may be the name of a dictionary that is prepared for information indicating the content of a character string and that is used in the character recognition. The coordinate x, the coordinate y, the width w, and the height h" are information regarding the coordinates of the entry field Ra in the paper document Bk and respectively correspond to the coordinate x, the coordinate y, the width, and the height of the entry field Ra. In other words, the coordinate information indicates the position and the size of the entry field Ra in the paper document Bk. The coordinates x and y represent the position of the upper left corner of the entry field Ra in a case where the upper left corner of the paper document Bk is the origin (0,0).

The memory 230 stores a dictionary used in the character recognition.

The terminal apparatus 30 includes a transmission/reception unit 310 that transmits and receives electronic information to and from an external apparatus, a reception unit 320 that receives an instruction from a user, a determination unit 330 that determines the presence of the character string such as "same as above", a search unit 340 that searches for a character string referenced by "same as above" or a similar character string, a display controller 350 that generates display data, a display 360 that displays the verification screen Ga, and a replacement unit 370 that replaces a character string.

The transmission/reception unit 310 transmits and receives electronic information to and from the management server 20. The transmission/reception unit 310 acquires, from the management server 20, image information regarding the paper document Bk that is data stored in the memory 230, definition information regarding the entry field Ra, and a result of OCR by the character recognition unit 220.

The reception unit 320 receives an instruction from the user. An operation for the user's instruction is performed, for example, on the verification screen Ga, and examples thereof include selecting a paper document Bk and correcting an OCR result.

The determination unit 330 determines whether the character string resulting from the character recognition is the characters or the symbol that refers to a reference character string that has appeared previously. Specifically, the determination unit 330 determines whether a character string Mt written in the entry field Ra has the characters such as "same as above", "same as left", or "ditto", or the symbol """ on the basis of the OCR result.

The search unit 340 searches for a character string referred to by the characters such as "same as above", "same as left", or "ditto", or the symbol """. Specifically, the search unit 340 searches the paper document Bk for a character string referred to by the characters or the symbol. In other words, the search unit 340 searches for a character string referred to by the characters such as "same as above", "same as left", or "ditto", or the symbol """.

The display controller 350 generates display data for a screen displayed on the display 360. The display 360 displays an image on the basis of the display data generated by the display controller 350.

The image displayed herein is the verification screen Ga described above.

The replacement unit 370 replaces the characters such as "same as above", "same as left", or "ditto", or the symbol """" with a character string referred to by the characters or the symbol (also referred to as a reference character string). That is, the characters such as "same as above", "same as left", or "ditto", or the symbol """" is corrected to the reference character string.

Detailed Description of Verification Screen Ga

The verification screen Ga is described in detail.

FIGS. 8A and 8B are views illustrating a first example of the verification screen Ga.

FIG. 8A is a view illustrating the whole verification screen Ga. An image Ga1 based on the image information regarding the paper document Bk is displayed in the left part of FIG. 8A illustrating the verification screen Ga. The image Ga1 is thus the image of the paper document Bk scanned by the image forming apparatus 10.

The OCR result is displayed as a recognition result list Ga2 in the right part of FIG. 8A illustrating the verification screen Ga.

FIG. 8B is a view of an enlarged part of the recognition result list Ga2. In the illustrated example, recognition results Nk1 to Nk3 of the recognition of three entry fields Ra are arranged downwards in FIG. 8B. The recognition result Nk1 located uppermost and the recognition result Nk2 located second uppermost represent a case where the characters such as "same as above", "same as left", or "ditto", or the symbol """" is not written in the corresponding entry field Ra. In this case, a handwritten character string Mt11 is displayed in the upper part of the recognition result Nk1. In the lower part, a character string Mc11 is displayed as the result of the OCR of the character string Mt11. Likewise, a handwritten character string Mt21 is displayed in the upper part of the recognition result Nk2. In the lower part, a character string Mc21 is displayed as the result of the OCR of the character string Mt21.

In contrast, the third recognition result Nk3 represents a case where the character "same as above" is written in the entry field Ra. In this case, a handwritten character string Mt31 is displayed in the middle part of the recognition result Nk3, which indicates that the character string "same as above" is written in the entry field Ra. In the upper part, a handwritten character string Mt32 is displayed as a character string referenced by "same as above", which indicates that the handwritten character string Mt32 referenced by "same as above" is "X-Y-Z Aichi City". Further, in the lower part, a character string Mc32 is displayed as the result of the OCR of the character string Mt32.

Accordingly, the content of the verification screen Ga is displayed in such a manner that handwritten character strings (in this case, the character string Mt31 and the character string Mt32) respectively corresponding to the characters or the symbol and the reference character string and the result of the OCR of the reference character string (in this case, the character string Mc32) are displayed parallel to each other.

The user B verifying the OCR result thereby determines whether the OCR result is correct easily.

Also in this exemplary embodiment, the user B may select a part of the recognition result Nk3 with the input device such as the mouse. In this case, the entry field Ra having the character string Mt31 "same as above" and the entry field Ra for the character string Mt32 referenced by "same as above" ("reference" in FIG. 8A) are highlighted respectively at a position Pj31 and a position Pj32 in the image Ga1. In this case, the character string Mt32 referenced by the character string Mt31 "same as above" is located on the upper side of the character string Mt31. When the character string Mt31 is the symbol """", the character string Mt31 and the character string Mt32 have the same positional relationship.

In other words, not only the verification screen Ga but also the image of the paper document Bk having the handwritten character strings Mt31 and Mt32 is displayed, and the positions of the part corresponding to the character string Mt31 "same as above" and the part corresponding to the character string Mt32 referenced by "same as above" are indicated in the image of the paper document Bk.

This enables the user B verifying the OCR result to verify the positions of the character string Mt31 and the character string Mt32 in the paper document Bk, and thereby the user B more easily determines whether the OCR result is correct.

When the user B selects a part of the recognition result Nk1, highlighting is performed at the position of the entry field Ra having the character string Mt11 in the image Ga1. Likewise, when the user B selects a part of the recognition result Nk2, highlighting is performed at the position of the entry field Ra having the character string Mt21 in the image Ga1.

Figure 9A:
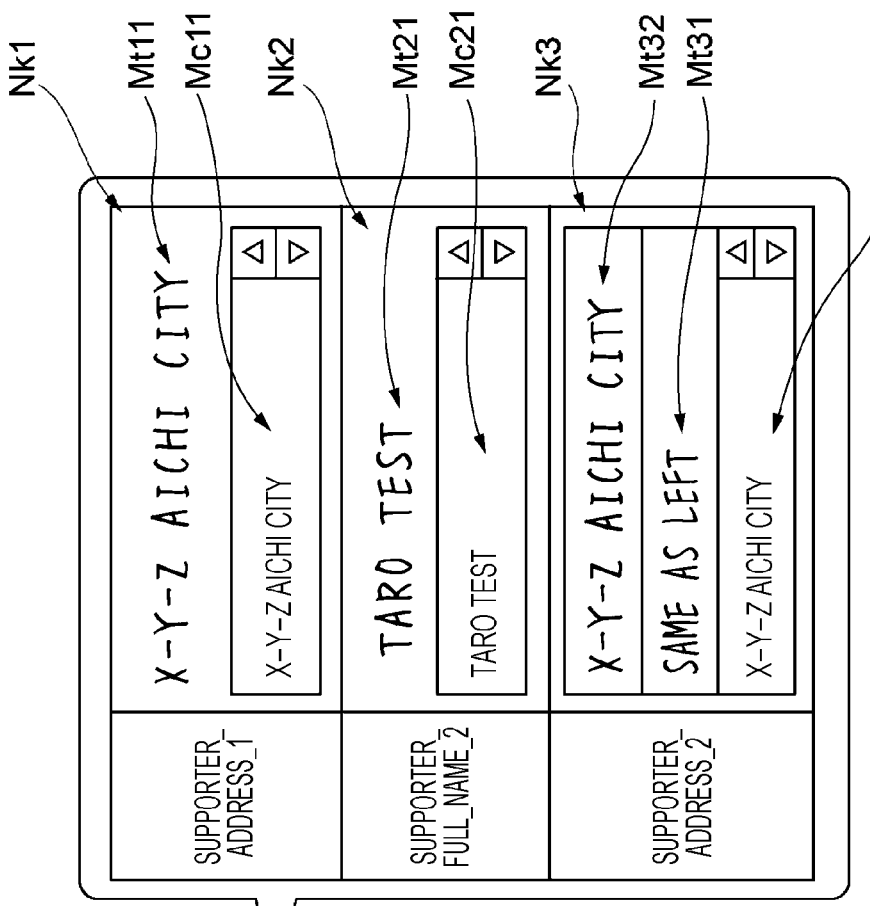
FIGS. 9A and 9B are views illustrating a second example of the verification screen.
Figure 9B:
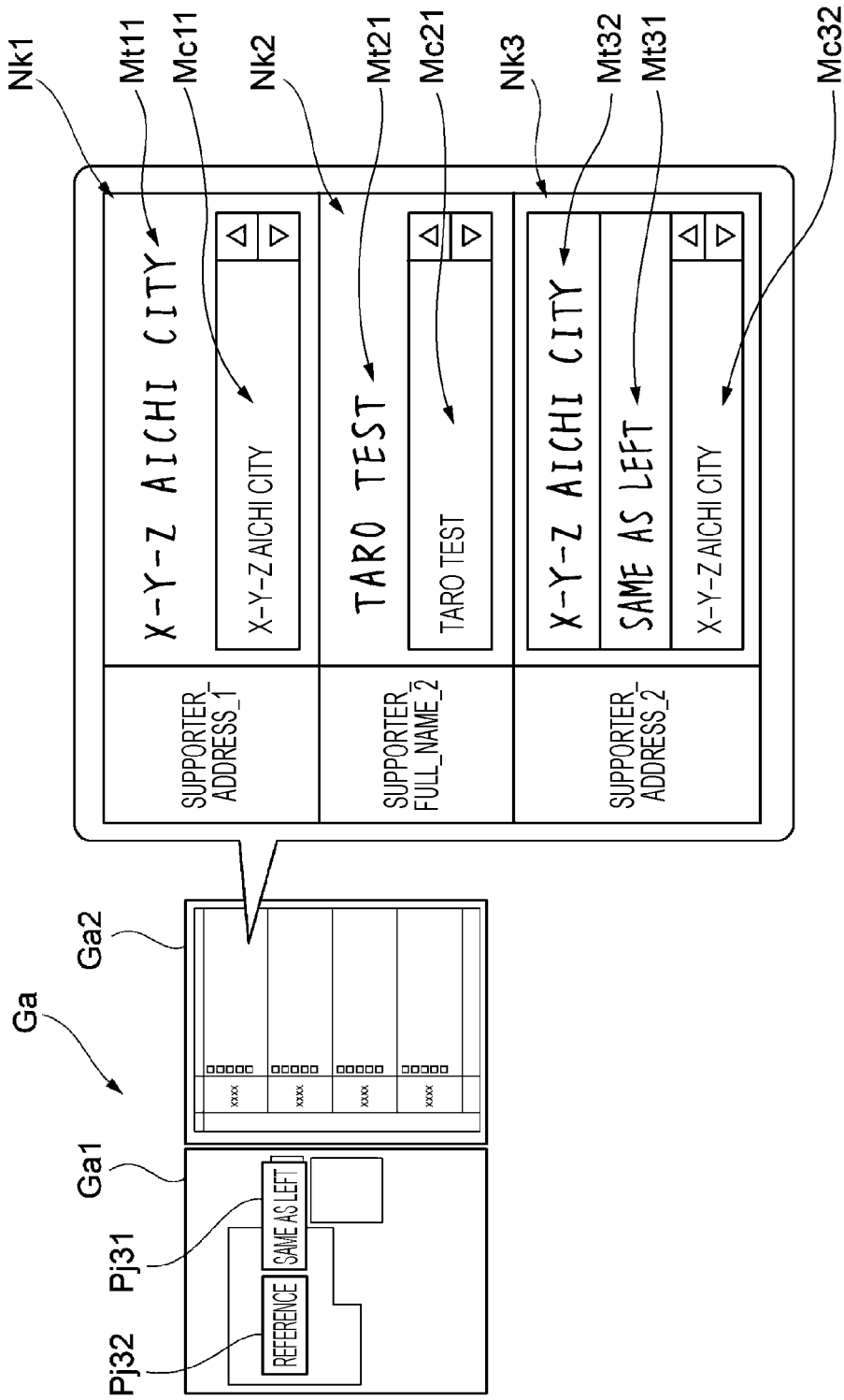

FIGS. 9A and 9B are views illustrating a second example of the verification screen Ga.

The example illustrated in FIG. 9B is the same as the example illustrated in FIG. 8B except that the character string Mt31 is changed from "same as above" to "same as left".

FIG. 9A illustrates a case where the entry field Ra having the character string Mt31 "same as left" and the entry field Ra having the character string Mt32 ("reference" in FIG. 9A) referenced by "same as left" are highlighted respectively at the position Pj31 and the position Pj32 in the image Ga1. In this case, the character string Mt32 referenced by the character string Mt31 "same as left" is located on the left side of the character string Mt31.

Detailed Description of Operations of Terminal Apparatus 30

The operations of the terminal apparatus 30 are described in detail.

FIGS. 10 to 14 are flowcharts of the operations of the terminal apparatus 30.

Figure 10:
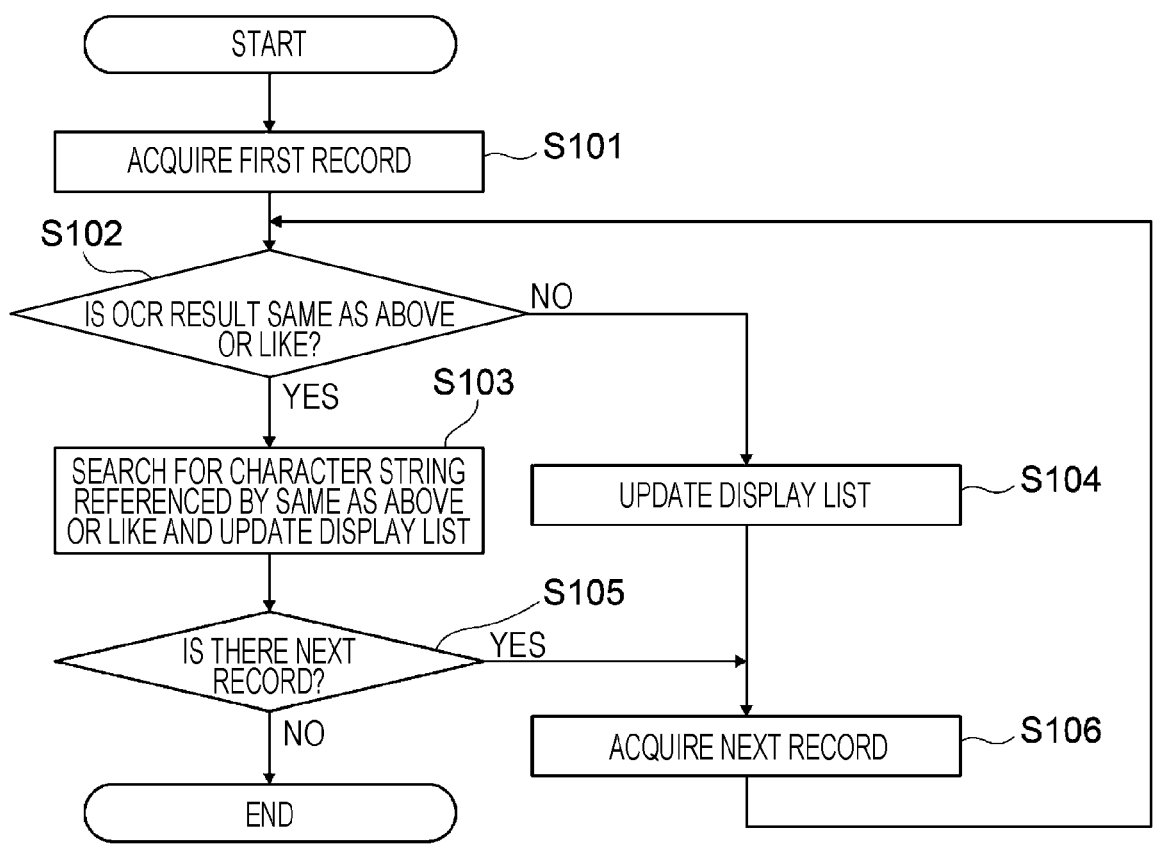
FIG. 10 is a flowchart of generating a display list for displaying a recognition result list on the verification screen in FIGS. 9A and 9B.

FIG. 10 is a flowchart of steps of generating a display list for displaying the recognition result list Ga2 on the verification screen in FIG. 9A.

First, the transmission/reception unit 310 acquires the first record from the table T having character recognition data in the memory 230 of the management server 20 (step S101). This record is "full name, Taro Test, name, 30, 50, 100, and 30" in the example illustrated in FIG. 7.

The determination unit 330 then determines whether the OCR result in the acquired record is the characters such as "same as above", "same as left", or "ditto", or the symbol """" (step S102).

If the OCR result is the characters such as "same as above", "same as left", or "ditto", or the symbol """" (Yes in step S102), the search unit 340 searches the paper document Bk for a reference character string, and the display controller 350 updates the display list (step S103). Step S103 will be described in detail later.

In contrast, if the OCR result is not the characters such as "same as above", "same as left", or "ditto", or the symbol """" (No in step S102), the display controller 350 updates the display list on the basis of this. Specifically, the display controller 350 adds a handwritten character string Mk and the result of the OCR of the character string Mk to the display list (step S104). That is, settings for displaying a result such as the recognition result Nk1 or the recognition result Nk2 in FIG. 8B is added.

After steps S103 and S104 are performed, the transmission/reception unit 310 determines whether there is a next record (step S105).

If there is a next record in the determination result, (Yes in step S105), the transmission/reception unit 310 acquires the next record (step S106) and returns to step S102.

In contrast, if there is not a next record (No in step S105), the series of steps is terminated.

Figure 11:
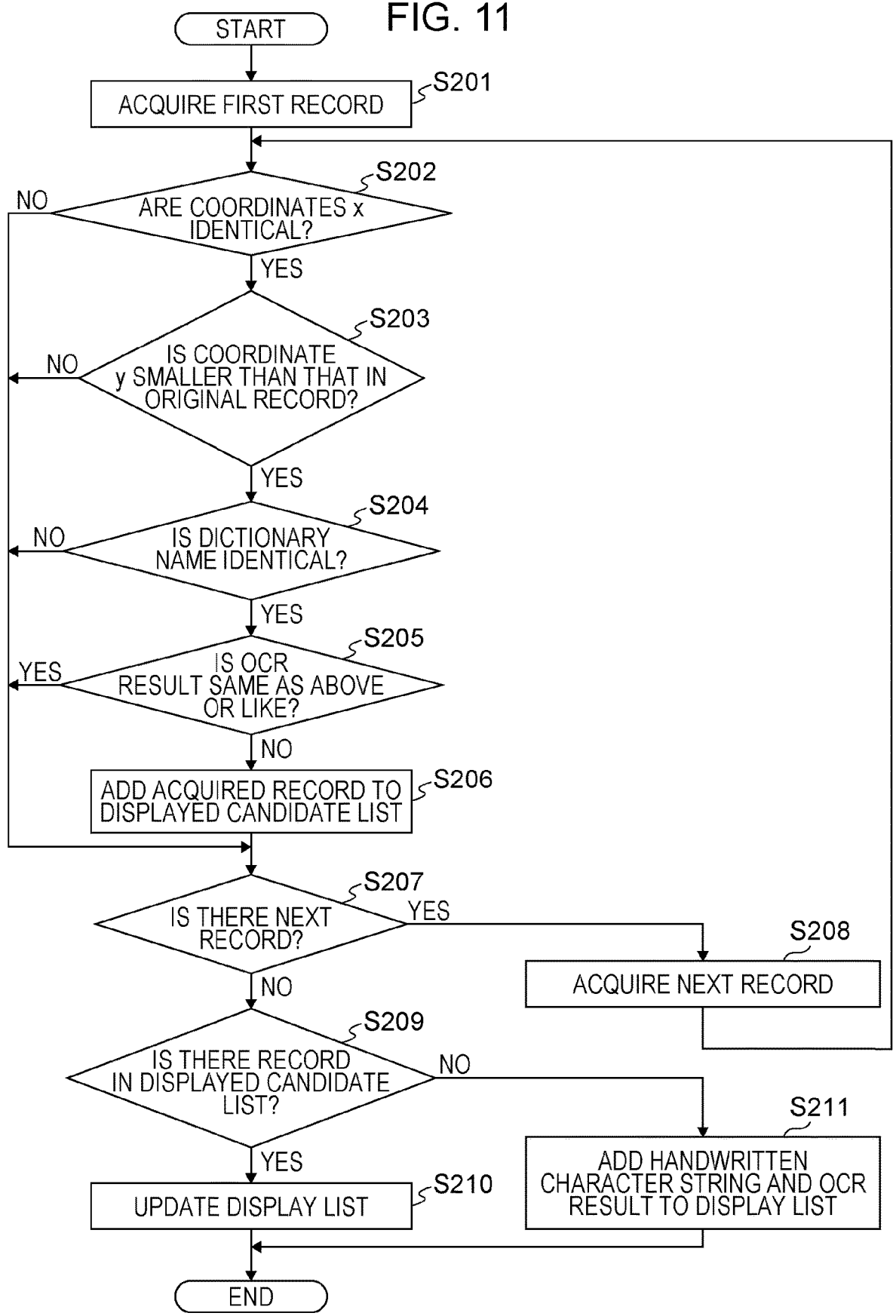
FIG. 11 is a flowchart of searching a paper document by a search unit for a character string referenced by the characters "same as above"
Figure 12:
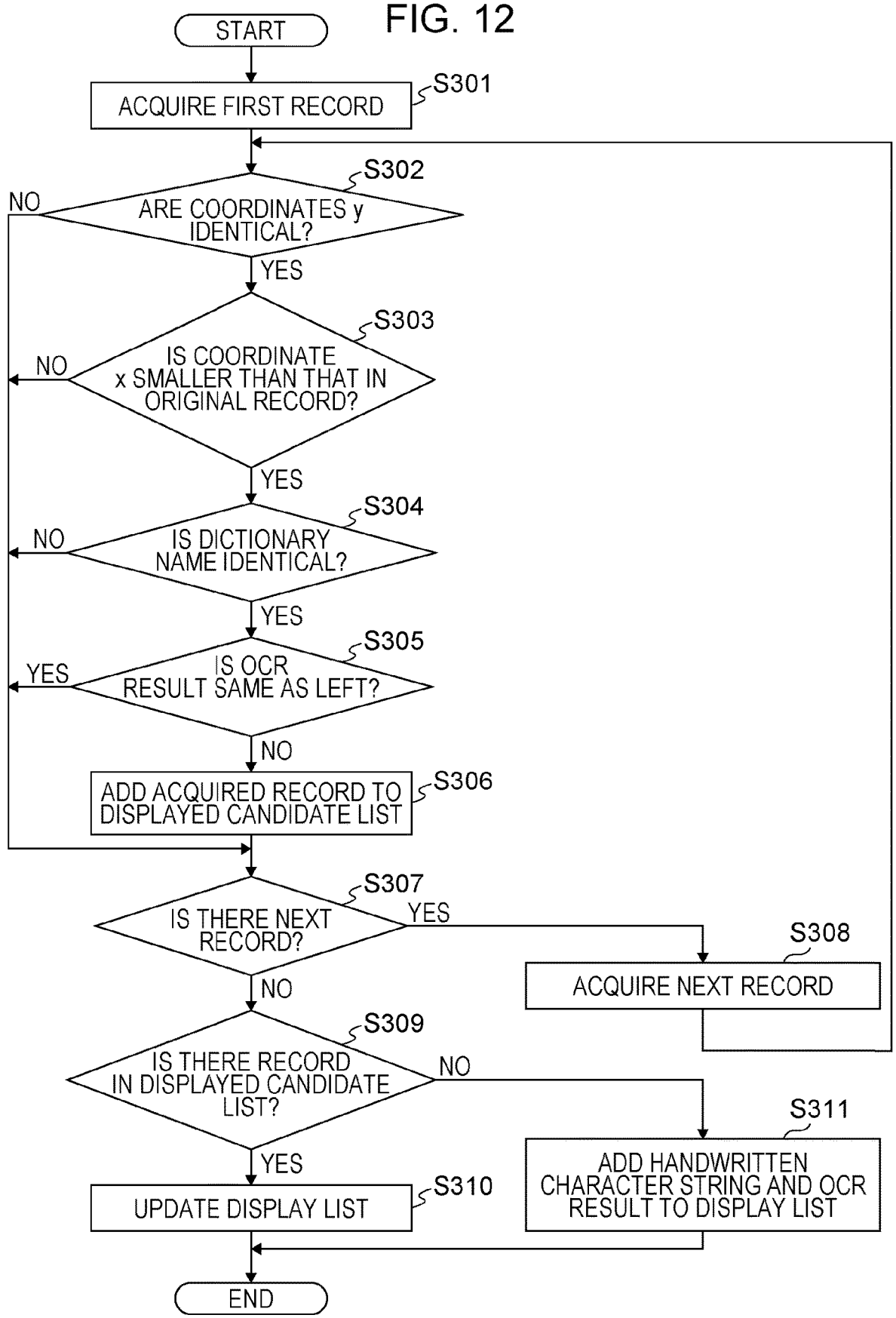
FIG. 12 is a flowchart a flowchart of searching the paper document by the search unit for a character string referenced by the characters "same as left"

FIGS. 11 and 12 are flowcharts explaining step S103 in FIG. 10 in more detail.

FIG. 11 is a flowchart of searching the paper document Bk by the search unit 340 for a character string referenced by "same as above". Note that searching the paper document Bk for a character string referenced by "ditto" or """ is performed in the same manner.

First, the transmission/reception unit 310 acquires the first record from the table T having character recognition data in the memory 230 of the management server 20 (step S201).

The search unit 340 then determines whether the coordinate x in the record acquired in step S201 is identical to the coordinate x in the record having "same as above" (step S202). Specifically, the search unit 340 determines whether the coordinate x of the entry field Ra acquired in step S201 is identical to the coordinate x of the entry field Ra having "same as above".

If the coordinates x are identical in the determination result (Yes in step S202), the search unit 340 determines whether the coordinate y in the record acquired in step S201 is smaller than the coordinate y in the record having "same as above" (step S203). Specifically, the search unit 340 determines whether the entry field Ra acquired in step S201 is located higher than the entry field Ra having "same as above" is.

If the acquired entry field Ra has a smaller coordinate y (Yes in step S202), that is, if the acquired entry field Ra is located higher, the search unit 340 determines whether the dictionary name in the record acquired in step S201 is identical to the dictionary name in the record having "same as above" (step S204). In other words, whether the entry fields Ra have the same content is herein determined on the basis of the used dictionary. Specifically, for example, it is conceivable that if each of dictionary names is name dictionary, the entry fields Ra have full names having the content of the same type. It is conceivable that if the dictionary names are different in contrast, the entry fields Ra have mutually different content such as a full name and an address.

If the content is identical in the determination result, (Yes in step S204), the search unit 340 determines whether the OCR result in the record acquired in step S201 is "same as above", "ditto", or """ (step S205). Specifically, the search unit 340 determines whether the character string referenced by "same as above" is "same as above", "ditto", or """.

If the OCR result is not "same as above", "ditto", or """ (No in step S205), the record acquired in step S201 is added to the displayed candidate list (step S206).

Hence, in steps S202 and S203, the search unit 340 first determines whether the entry field Ra in the record acquired in step S201 is located higher in a vertical direction than the entry field Ra in the record having "same as above". Further, if the content is determined to be of the same type in step S204, the search unit 340 determines that the character string Mt in the entry field Ra acquired in step S201 is a candidate for the character string referenced by "same as above".

Subsequent to step S206, the transmission/reception unit 310 determines whether there is a next record (step S207). If the OCR result is "same as above", "ditto", or """ in step S205 (Yes in step S205), or if the determination result is No in step S202, S203, or S204, step S207 is also performed.

If there is a next record in the determination result, (Yes in step S207), the transmission/reception unit 310 acquires the next record (step S208) and returns to step S202.

In contrast, if there is not a next record (No in step S207), the display controller 350 determines whether the displayed candidate list has at least one record as a candidate (step S209).

If there is at least one record in the determination result (Yes in step S209), the display controller 350 updates the display list by a predetermined method (step S210). How the display controller 350 updates the display list will be described later.

In contrast, if there is not a record, (No in step S209), that is, if the entry field Ra having the character string Mt referenced by "same as above" is not found, the display controller 350 updates the settings of the aforementioned display list on the basis of this.

Specifically, the display controller 350 adds a handwritten character string Mk and the result of the OCR of the character string Mk to the display list (step S211). That is, a setting for displaying a blank for the character string Mt32 in the recognition result Nk3 in FIG. 8B is added.

FIG. 12 is a flowchart of searching the paper document Bk by the search unit 340 for a character string referenced by "same as left".

In FIG. 12, step S301 and steps S304 to S311 are performed in the same manner as for step S201 and steps S204 to S211 in FIG. 11.

Accordingly, steps S302 and S303 that are different from the corresponding steps in FIG. 11 are herein mainly described.

In step S302, the search unit 340 determines whether the coordinate y in the record acquired in step S301 is identical to the coordinate y in the record having "same as left" (step S302). Specifically, the search unit 340 determines whether the coordinate y of the entry field Ra acquired in step S301 is identical to the coordinate y of the entry field Ra having "same as left".

If the coordinates y are identical in the determination result (Yes in step S302), the search unit 340 determines whether the coordinate x in the record acquired in step S301 is smaller than the coordinate x in the record having "same as left" (step S303). Specifically, the search unit 340 determines whether the entry field Ra acquired in step S301 is located on the left side of the entry field Ra having "same as left".

If the coordinate x in the record acquired in step S301 is smaller (Yes in step S302), that is, if the entry field Ra acquired in step S301 is located on the left side, the search unit 340 determines whether the dictionary name in the record acquired in step S301 is identical to the dictionary name of the record having "same as left" (step S304).

Hence, in steps S302 and S303, the search unit 340 first determines whether the entry field Ra in the record acquired in step S301 is located on the left side of the entry field Ra in a record having "same as left". Further, if the content is determined to be of the same type in step S304, the search unit 340 determines that the character string Mt in the entry field Ra acquired in step S301 is a candidate for the character string referenced by "same as left".

As described with reference to FIGS. 11 and 12, the search unit 340 searches for a character string in a direction decided in accordance with the characters such as "same as above", "same as left", or "ditto", or the symbol """. That is, in the case of "same as above", "ditto", or """, the entry field Ra having a character string Mt referred to by the characters or the symbol is located higher than the entry field Ra having the characters or the symbol is. The search unit 340 thus performs searching upwards. In the case of "same as left", the entry field Ra having a character string Mt referred to by the characters is located on the left side of the entry field Ra having the characters. The search unit 340 thus performs searching leftwards. The search unit 340 uses the coordinates x and y of the entry field Ra having the character string Mt and determines the direction on the basis of the position of the entry field Ra.

The search unit 340 compares information regarding the entry field Ra having the characters such as "same as above", "same as left", or "ditto", or the symbol """ with information regarding the entry field Ra lying in the corresponding direction. If the attributes of the content of the entry fields Ra are identical, the information regarding the entry field Ra lying in the direction is regarded as a candidate for a reference character string. In this case, if the dictionaries used in the character recognition are identical as the attributes, the search unit 340 considers the attributes of the content to be identical.

Figure 13A:
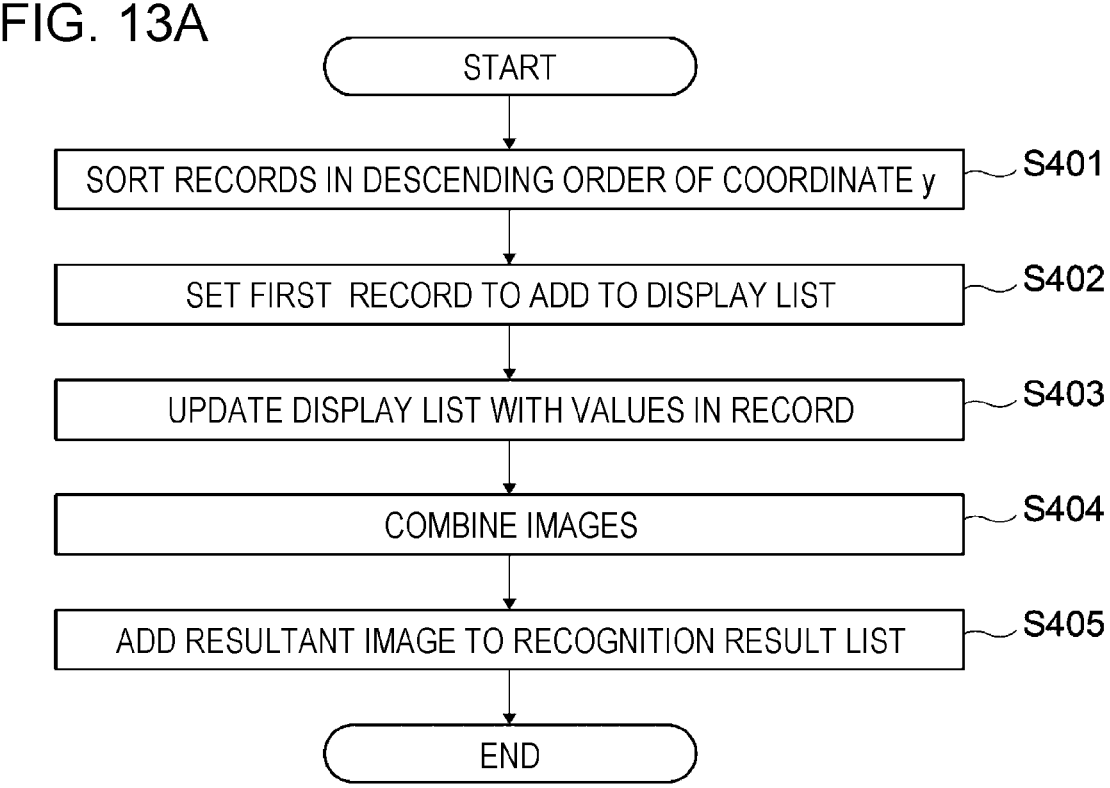
FIGS. 13A and 13B are flowcharts respectively explaining step S210 in FIG. 11 and step S310 in FIG. 12 in more detail.

FIG. 13A is a flowchart explaining step S210 in FIG. 11 in more detail.

In this case, the display controller 350 first sorts records of the displayed candidate list in a descending order of the coordinate y (step S401).

The display controller 350 then sets the first record of the sorted records as an item to be added to the display list (step S402). That is, if there are records in the displayed candidate list, a record closest to the record having the entry field Ra having "same as above" is selected.

Further, the display controller 350 updates the display list with the values of the record (step S403).

The display controller 350 then combines images on the basis of the display list to display an image for the recognition result Nk3 illustrated in FIG. 8B (step S404).

The display controller 350 adds an image resulting from the combining to the recognition result list Ga2 (step S405).

Figure 13B:
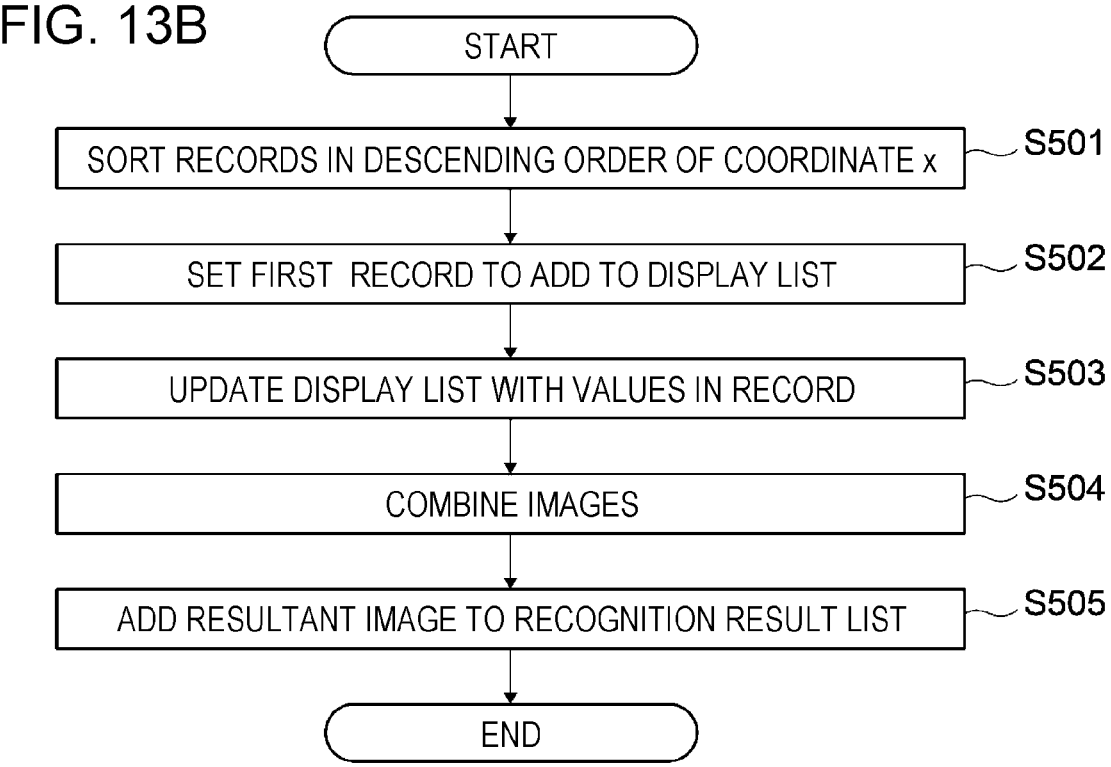

FIG. 13B is a flowchart explaining step S310 in FIG. 12 in more detail.

In this case, the display controller 350 first sorts records of the displayed candidate list in the descending order of the coordinate x (step S501).

Subsequent steps S502 to S505 are performed in the same manner as for steps S402 to S405 in FIG. 13A. Also in this case, if there are records in the displayed candidate list, a record closest to the record having the entry field Ra having "same as left" is selected.

Figure 14:
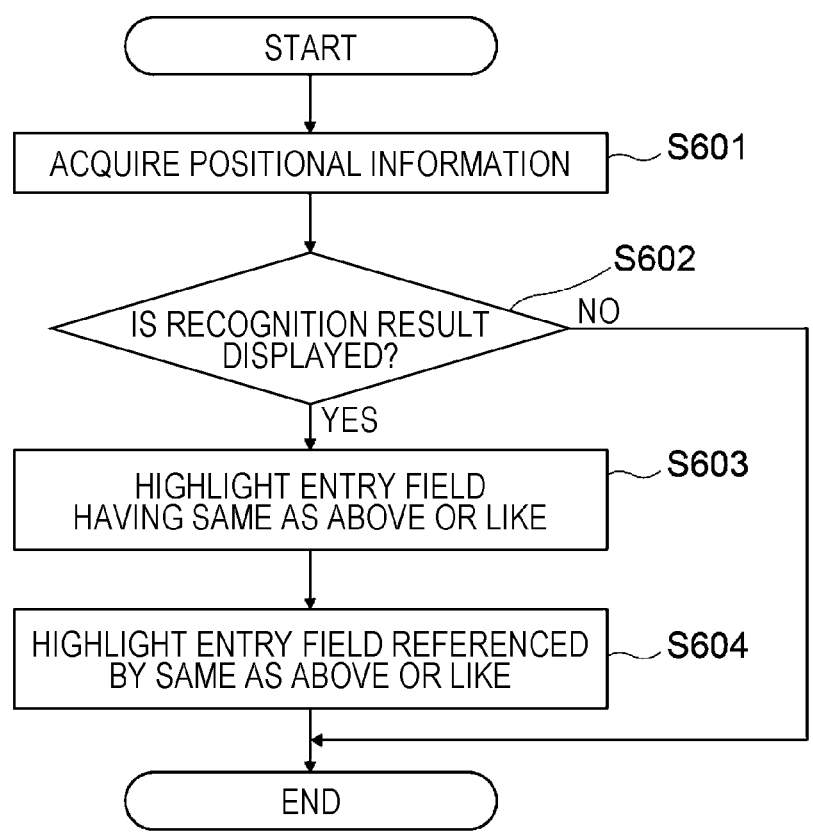
FIG. 14 is a flowchart of operations of a terminal apparatus performed when a user selects a part of a recognition result in the recognition result list by using an input device such as a mouse.

FIG. 14 is a flowchart of the operations of the terminal apparatus 30 performed when the user selects a part of a recognition result in the recognition result list Ga2 with the input device such as the mouse.

First, positional information regarding a part selected in the recognition result list Ga2 is acquired (step S601).

The display controller 350 then determines whether a recognition result is displayed in the part (step S602).

If the recognition result is displayed (Yes in step S602), an entry field Ra having the characters such as "same as above", "same as left", or "ditto", or the symbol """ is highlighted in the image Ga1 (step S603). Further, an entry field Ra referenced by the characters or the symbol is highlighted (step S604).

In contrast, if the recognition result is not displayed (No in step S602), the series of steps is terminated.

Figure 15:
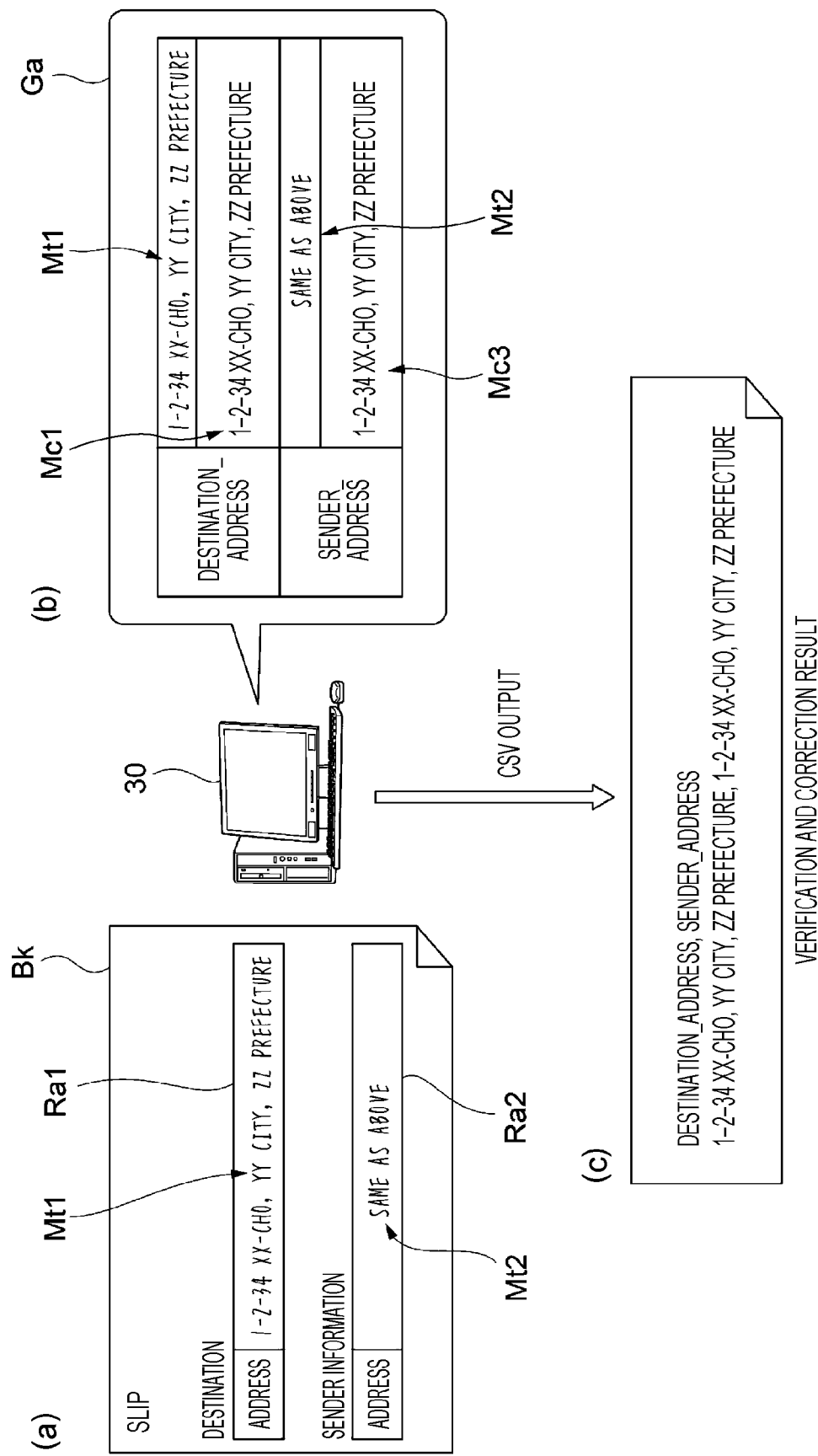
FIG. 15 is a view illustrating the operation of a replacement unit.

FIG. 15 is a view illustrating operations of the replacement unit 370.

After the user B verifies the result of character recognition on the verification screen Ga, the replacement unit 370 replaces the characters such as "same as above", "same as left", or "ditto", or the symbol """ with a reference character string.

FIG. 15(a) illustrates the paper document Bk scanned in 1A in FIG. 3.

The paper document Bk is the same as the paper document Bk illustrated in FIG. 5(a), and entry fields Ra1 and Ra2 for addresses are respectively provided as destination information and sender information. FIG. 15(a) illustrates a case where the user A writes the address of the destination as a character string Mt1 in the entry field Ra1.

FIG. 15(b) illustrates the result of the OCR of the paper document Bk illustrated in FIG. 15(a).

The OCR result illustrated in FIG. 15(b) indicates that the character string Mt1 handwritten by the user A is recognized as a character string Mc1 for the destination address, and the character string Mt2 handwritten by the user A is recognized as a character string Mc3 for the sender address. Note that the character string Mc2 is replaced with the character string Mc3 by the replacement unit 370. That is, the character string Mt2 is first recognized as "same as above" as the character string Mc2 as illustrated in FIG. 5(b) but is replaced with the character string Mc3 referenced by "same as above" by the replacement unit 370. In this case, "same as above" as the character string Mc2 is replaced with "1-2-34 XX-cho, YY City, ZZ Prefecture" as the character string Mc3.

FIG. 15(c) illustrates an example of a verification and correction result.

In this example, the verification and correction result is output in the CSV format. FIG. 5(c) illustrates the output data "destination_address, sender_address, 1-2-34 XX-cho, YY City, ZZ Prefecture, 1-2-34 XX-cho, YY City, ZZ Prefecture".

According to the examples described above in detail, even in the presence of a character string or a symbol that refers to a reference character string that has appeared previously, an information processing apparatus that reduces the burden of verifying the result of character recognition placed on a user may be provided.

In the above described examples, the case where the characters such as "same as above", "same as left", or "ditto", or the symbol """ is described in English has heretofore been described; however, a different language is applicable. For example, in a case where character strings such as "doh-jo" denoting "same as above" or "doh-hi-da-ri" denoting "same as left" are described in a paper document Bk written in Japanese, similar processing may be performed.

Program

Processing by the terminal apparatus 30 in this exemplary embodiment is implemented by software and hardware resources in corporation with each other. That is, the CPU in the terminal apparatus 30 implements the functions of the terminal apparatus 30 in such a manner as to run a program implementing the corresponding function of the terminal apparatus 30.

The processing performed by the image forming apparatus 10 may also be regarded as a program causing a computer to execute acquiring a result of character recognition of a handwritten document and in response to a determination that a handwritten character string includes a character or a symbol that refers to a reference character string that has appeared previously, replacing the character or the symbol with the reference character string that is referred to by the character or the symbol.

The exemplary embodiment has heretofore been described. The technical scope of the disclosure is not limited to the scope of the exemplary embodiment. From the description of the scope of claims, it is apparent that the technical scope of the disclosure includes various modifications and improvements made to the exemplary embodiment.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
   acquire a result of optical character recognition of a character string formed on a medium and read by scanning that is subject to character recognition;
   determine whether the result of optical character recognition of the character string is a predetermined character or a predetermined symbol that refers to a reference character string that has appeared in a subject previously;
   search for the reference character string referred to the predetermined character or the predetermined symbol in the subject; and
   replace the predetermined character or the predetermined symbol in the subject with the reference character string.

2. The information processing apparatus according to claim 1,
   wherein the processor is configured to display a verification screen that prompts a user to verify a new character string obtained by the replacing.

3. The information processing apparatus according to claim 2,
   wherein the processor is configured to display, as the verification screen, handwritten character strings and the reference character string resulting from the character recognition parallel to each other, the handwritten character strings respectively corresponding to the character or the symbol and the reference character string.

4. The information processing apparatus according to claim 2,
   wherein the processor is configured to further display an image of a document having a handwritten character string in addition to the verification screen, and
   wherein the processor is configured to indicate, in the image of the document, respective positions of a part corresponding to the character or the symbol and a part corresponding to the reference character string.

5. The info illation processing apparatus according to claim 4,
   wherein the processor is configured to indicate, in the image of the document, the positions of the part corresponding to the character or the symbol and the part corresponding to the reference character string, the positions being indicated in response to selecting an item in the verification screen by a user.

6. The information processing apparatus according to claim 1,
   wherein the processor is configured to search for a character string lying in a direction decided in accordance with the character or the symbol.

7. The information processing apparatus according to claim 6,
   wherein the processor is configured to determine the direction on a basis of a position of a frame including a character string.

8. The information processing apparatus according to claim 6,
   wherein the processor is configured to compare information regarding a frame including the character or the symbol with information regarding a frame lying in the direction and to set a found character string as a candidate for the reference character string when attributes of content of the frames are identical.

9. The information processing apparatus according to claim 8,
   wherein the processor is configured to consider the attributes of the content to be identical when dictionaries used in the character recognition are identical as the attributes.

10. The information processing apparatus according to claim 8,
    wherein the processor is configured to select a candidate located closest to the character or the symbol among a plurality of the candidates.

11. The information processing apparatus according to claim 1,
    wherein the processor is further configured to
    replace with the reference character string in a frame immediately above the character or the symbol.

12. A non-transitory computer readable medium storing a program causing a computer to execute a process for information management, the process comprising:
    acquiring a result of optical character recognition of a character string formed on a medium and read by scanning that is subject to character recognition;
    determining whether the result of optical character recognition of the character string is a predetermined character or a predetermined symbol that refers to a reference character string that has appeared in a subject previously;

searching for the reference character string referred to the predetermined character or the predetermined symbol in the subject; and replacing the predetermined character or the predetermined symbol in the subject with the reference character string.

13. A character recognition system comprising:

a reader that reads an image of a document having a handwritten character string;

a character recognizer that performs character recognition of the handwritten character string;

a display that displays a verification screen that prompts a user to verify a result of the character recognition by the character recognizer; and an image generator that generates an image of the verification screen, the image generator including a processor configured to acquire the result of the character recognition from the character recognizer and in response to a determination that the handwritten character string includes a character or a symbol that refers to a reference character string that has appeared previously, replace the character or the symbol with the reference character string that is referred to by the character or the symbol.

* * * * *